(No Model.)  2 Sheets—Sheet 1.

J. WALRATH.
WHEEL.

No. 403,864.  Patented May 21 1889.

Witnesses  
G. A. Tauberschmidt  
L. S. Whitaker

Inventor  
Jesse Walrath  
By his Attys.  
Whitaker & Prevost

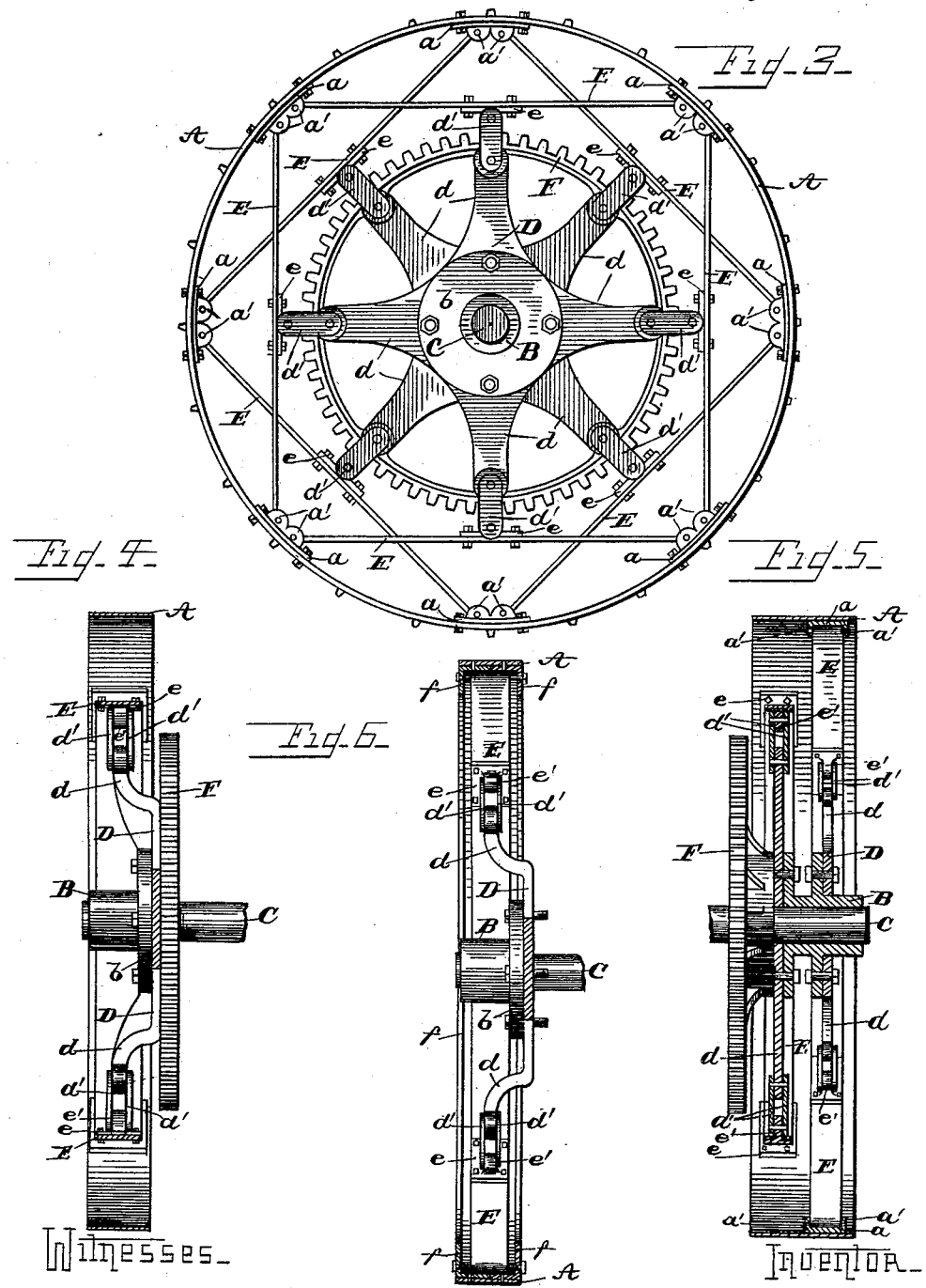

UNITED STATES PATENT OFFICE.

JESSE WALRATH, OF RACINE, WISCONSIN.

WHEEL.

SPECIFICATION forming part of Letters Patent No. 403,864, dated May 21, 1889.

Application filed May 28, 1888. Serial No. 275,353. (No model.)

*To all whom it may concern:*

Be it known that I, JESSE WALRATH, a citizen of the United States, residing at Racine, in the county of Racine and State of Wisconsin, have invented certain new and useful Improvements in Wheels; and I do hereby declare the following to be a full, clear, and exact description of the invention, such as will enable others skilled in the art to which it appertains to make and use the same.

My invention relates to the class of wheels and is more particularly an improvement in wheels for traction-engines. It consists in certain peculiarities of construction whereby the same are made elastic.

I am aware that wheels of this class have been constructed having a series of springs the adjacent ends of which are secured to the rim of the wheel at single points, forming angles, where they are connected to the felly, and that elliptical and semi-elliptical springs have also been used; but my invention differs from these constructions, as will hereinafter appear.

Some of the forms in which I have contemplated embodying my invention are illustrated in the accompanying drawings, and the invention itself is fully disclosed in the following specification and claims.

Figure 1:
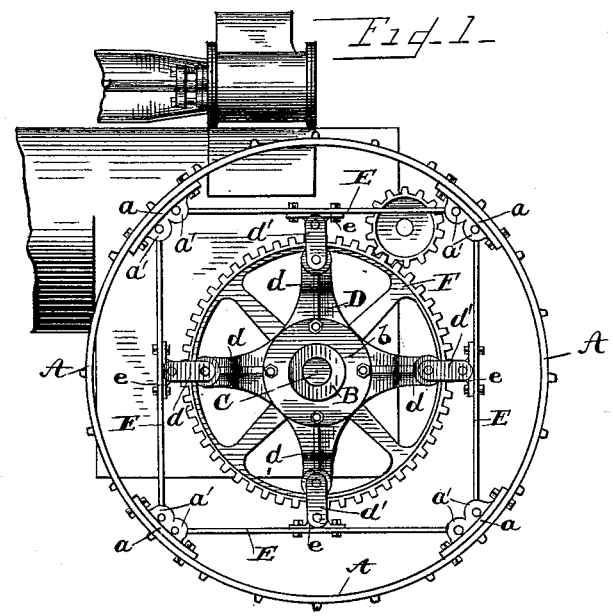
Figure 2:
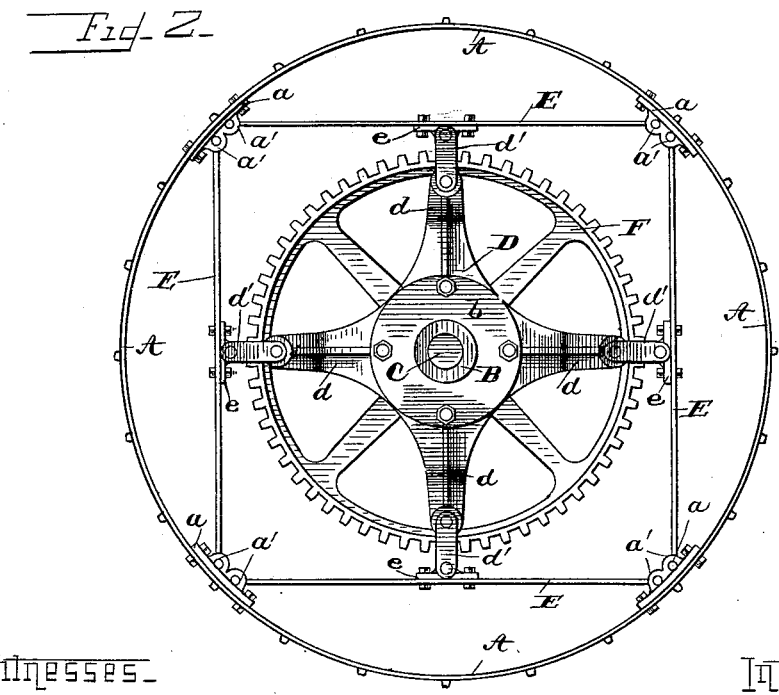

In the drawings, Figure 1 is a partial side view of a traction-engine with a wheel embodying my invention applied thereto. Fig. 2 is a larger side view of such wheel. Fig. 3 is a side view of a modified form. Fig. 4 is a sectional view of the form shown in Fig. 2. Fig. 5 is a section of the form shown in Fig. 3, and Fig. 6 is a section of still another construction.

In the drawings, A is the rim or tire of the wheel, which may be of ordinary or preferred construction.

B is the hub of the wheel, and C the axle on which the wheel is mounted. The hub is connected to the tire by the following means: The hub has a flange, $b$, which is attached to a spider, D, having arms $d$ extending radially from the center of the wheel. To the inner side of the rim or tire A are attached three or more plates, $a$, provided at each side with ears $a'$ $a'$. Spring bars or plates E extend from one plate $a$ to the next nearest plate of like character, forming a square or other polygonal figure within the rim or tire of the wheel and around the hub. These spring-bars are provided with an eye or analogous construction at each end and a bolt passing through the ears $a'$, and such eye secures the bars E to the rim or tire of the wheel. A plate, $e$, provided with an ear, $e'$, is attached centrally to each of the spring-bars E, and the outer ends of arms $d$ are connected with ears $e'$ by links $d'$ $d'$. The gear-wheel F is preferably connected to the spider D in the manner shown in the drawings, the center of the spider being offset to secure the proper position of the gear.

When a wheel of greater strength is desired, I may double the number of spring-bars, as shown in Fig. 3. When this construction is employed, I prefer to attach the ends of one set of springs midway between the points of attaching the other set of springs. In this case I have shown the connection of the hub with these bars as consisting of two spiders, D; but it is obvious that a single spider with double the number of arms $d$ may be employed. In this construction the center of the spiders is in the same plane as that of the arms $d$, and the gear-wheel F is provided with a hub, by which it is connected with the traction-wheel.

In the first five figures of the drawings a certain amount of elasticity is or may be secured by making the rim or tire elastic; but in Fig. 6 a form of wheel is shown in which the rim of the wheel is substantially rigid. In the construction there shown the wheel is provided at each side with an inwardly-extending flange, $f$. These flanges provide a means for attaching the spring-bars to the rim and enables me to dispense with the plates $a$. It is obvious that the flanges $f$ may be placed centrally of the rim of the wheel, or the rim provided with a single flange so located and the desired rigidity secured.

The flanges $f$ in the drawings are formed by attaching angle-irons to the tire or rim, and this construction can be employed whether the flange is at the edges of the rim or is disposed centrally of the same; but they may be formed in other ways.

It will be noted that in all the constructions shown the spring-bars may be made to brace and strengthen the rim or tire, if desired.

While I have shown the spring-bars E as four in number and arranged in the form of a square, they may be three in number only, or any greater number, and arranged in different forms as may best suit the character of wheel to be constructed or the peculiar service for which the wheel is intended.

The springs E may be what are termed "leaf-springs," or other similar form of spring, instead of straight spring-bars.

The operation of the device will be apparent from the foregoing description. The spring-bars E receive the weight upon the wheel, and as the wheel strikes against and passes over obstructions or inequalities in the path of the same yield sufficiently to save the axles and the supported parts from jar and strain.

I do not desire to be limited to the exact construction shown, as there may be considerable variations in structure without departing from the spirit of my invention.

What I claim, and desire to secure by Letters Patent, is—

1. A wheel provided with three or more bar-springs interposed between the hub and the tire or rim, each spring being connected at its ends to the said tire or rim at points independent of the connections of the other springs, substantially as described.

2. A wheel provided with three or more bar-springs interposed between the hub and the tire or rim and connected to the hub, each spring being connected at its ends to said tire or rim at points independent of the connections of the other springs, substantially as described.

3. A wheel provided with three or more bar-springs, each spring being connected to the tire or rim at points independent of the connections of the other springs and connected centrally or intermediately with arms rigidly attached to said hub in line with said arms, substantially as described.

4. The combination, with the rim or tire, of bar-springs having their ends attached to said rim or tire at points independent of the connections of the other springs, arms rigidly attached to the hub and extending radially therefrom, and a flexible connection between each of the springs and one of the said arms, substantially as described.

5. The combination, with the rim or tire, of the hub and spider rigidly attached thereto, bar-springs, each connected to the rim or tire at points independent of the connections of the other springs, and links connecting the spider-arms centrally with the said springs in line with said arms, substantially as described.

6. The combination, with the rim or tire, of the hub, arms rigidly attached thereto and extending radially therefrom, and two series of bar-springs in different vertical planes interposed between the hub and the tire or rim, each spring having its ends connected to the rim or tire and connected intermediate its ends with one of the said radial arms, the ends of one set of springs being connected to the tire or rim intermediate the ends of the other set of springs, substantially as described.

In testimony whereof I affix my signature in presence of two witnesses.

JESSE WALRATH.

Witnesses:
CHARLES H. LEE,
GEO. L. EDDY.